United States Patent [19]

Marx et al.

[11] 4,452,997

[45] Jun. 5, 1984

[54] PROCESS FOR THE PREPARATION OF POLYESTER POLYOLS AND/OR POLYESTER-POLYETHER POLYOLS

[75] Inventors: Matthias Marx, Bad Durkheim; Wolfgang Straehle, Heidelberg, both of Fed. Rep. of Germany

[73] Assignee: BASF Aktiengesellschaft, Ludwigshafen, Fed. Rep. of Germany

[21] Appl. No.: 452,411

[22] Filed: Dec. 23, 1982

[30] Foreign Application Priority Data

Jan. 16, 1982 [DE] Fed. Rep. of Germany ....... 3201203

[51] Int. Cl.$^3$ .............................................. C07C 67/26
[52] U.S. Cl. ..................................... 560/200; 560/91; 560/93; 568/46
[58] Field of Search .......................... 560/200, 91, 93; 568/46

[56] References Cited

U.S. PATENT DOCUMENTS

| | | | |
|---|---|---|---|
| 3,459,733 | 8/1969 | Byrd et al. | 560/91 |
| 3,494,605 | 2/1970 | Rehfuss | 560/200 |
| 3,585,185 | 6/1971 | Levis et al. | 560/198 |
| 4,144,395 | 3/1979 | Murphy et al. | 560/91 |

Primary Examiner—Glennon H. Hollrah
Assistant Examiner—Vera C. Clarke
Attorney, Agent, or Firm—Norbert M. Lisicki; Joseph D. Michaels

[57] ABSTRACT

Polyester polyols and/or polyester-polyether polyols are prepared by reacting polyols preferably di- to hexafunctional polyether polyols with hydroxyl numbers of 30 to 200 with at least one carboxylic anhydride, preferably glutaric anhydride, resulting in a carboxylic acid half ester which is subsequently oxyalkylated with at least one alkylene oxide, preferably ethylene oxide in the presence of at least 1 thiodialkylene glycol, preferably thiodiethylene and/or thiodipropylene glycol.

7 Claims, No Drawings

PROCESS FOR THE PREPARATION OF POLYESTER POLYOLS AND/OR POLYESTER-POLYETHER POLYOLS

BACKGROUND OF THE INVENTION

1. Field of the Invention

The present invention relates to a process for the preparation of polyester polyols and/or polyester-polyether polyols. More particularly, the invention relates to polyester polyols and/or polyester-polyether polyols prepared by the oxyalkylation of carboxylic acid half esters in the presence of a catalytic amount of at least one thiodialkylene glycol.

2. Description of the Prior Art

Halogen and ester group containing polyether polyols are frequently used as a component for the preparation of flame resistant polyurethane foams.

According to data in German Application No. 19 23 936 (U.S. Pat. No. 3,585,195), such polyester polyether polyols are obtained by the reaction of polyether polyols with halogen-containing carboxylic anhydrides, particularly tetrabromoor tetrachlorophthalic anhydride to form carboxylic acid half esters with subsequent oxyalkylation of the free carboxyl groups with alkylene oxide.

The oxyalkylation is commonly carried out in the presence of bases, for example, alkali hydroxides or alkali alcoholates or acids as catalysts. A drawback of this method is that the catalysts, due to their low selectivity, not only accelerate the oxyalkylation of the carboxyl groups but also accelerate the addition of alkylene oxides to the resultant or already present hydroxyl groups of the polyester or polyether polyols. In order to guarantee complete esterification of all carboxyl groups, the oxyalkylation must, therefore, be carried out with a large excess of alkylene oxides accompanied by a long reaction period. Another drawback is the fact that the catalyst must be separated from the reaction mixture at the completion of the reaction requiring cumbersome and expensive purification operations.

In accordance with German Pat. No. 2,724,609 the oxyalkylation of chlorine-containing phthalic acid half esters is preferably carried out in the absence of catalysts in order to avoid subsequent purification. The uncatalyzed oxyalkylation, however, also requires a large alkylene oxide excess in order to esterify all carboxyl groups. Another drawback is that the unreacted alkylene oxides, which represent up to 15 percent by weight of the amount used, must be removed by distillation and must be disposed of which effects the economy of this method as well as its environmental soundness.

Also well known is the esterification of carboxylic acids with alkylene oxides in the presence of catalysts such as sulfuric acid, sodium acetate, iron (III)-chloride and others (*Methods of Organic Chemistry*, vol. VIII, Houben-Weyl, Georg Thieme Publishers, Stuttgart 1952, pages 531–533).

For the preparation of polyurethanes of organic polyisocyanates and compounds with reactive hydrogen atoms, polyether polyols with highly reactive hydroxyl groups are needed for various areas of application. These may be produced by introducing primary hydroxyl groups, for example, by oxyethylation of commonly used polyether polyols. This process requires a large excess of ethylene oxide which results in hydrophilic polyoxyethylene segments which impart hydrophilic properties to the polyurethanes produced therefrom. The hydrophilic character, however, is a drawback for important areas of application of polyether polyols, for example, in the preparation of foams.

Hydrophilic polyurethane foams, for example, foams used for insulating purposes or as upholstery material result in an uncontrollable impairment of their mechanical properties by absorbing water, are increasingly subject to a hydrolytic decomposition, and the loss of thermal insulating capacity.

DESCRIPTION OF THE PREFERRED EMBODIMENT

The purpose of this invention was to esterify carboxyl group-containing polyester polyols and/or polyester polyether polyols with alkylene oxides. Another purpose was to produce highly reactive polyester polyols and/or polyester polyether polyols with a low content of preferably terminal polymerized ethylene oxide groups.

These requirements are met by a process for the preparation of polyester polyols and/or polyester polyether polyols by reacting polyols with carboxylic anhydrides resulting in carboxylic acid half esters and subsequently oxyalkylating the carboxylic acid half esters with alkylene oxides wherein the oxyalkylation is carried out in the presence of a catalytic amount of at least one thiodialkylene glycol.

Surprisingly, it was found that the oxyalkylation in the presence of thiodialkylene glycols as catalysts for reacting the carboxyl groups required considerably lower amounts of alkylene oxides when compared with the methods known to those skilled in the art. Polyester-polyether polyols esterified with ethylene oxide have lower hydrophilic properties than polyether polyols with terminal polyoxyethylene blocks. Another advantage is the fact that the thiodialkylene glycols can remain in the reaction mixture and do not require separation by expensive purification processes.

The process according to this invention may be explained by the following reaction equation.

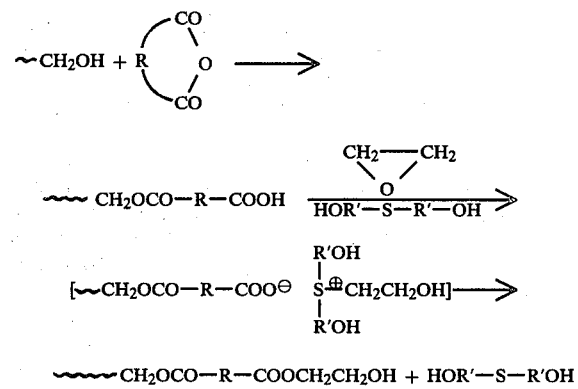

For the preparation of the polyester polyols and/or polyester-polyether polyols, carboxylic acid half esters are initially produced from polyols or mixtures of polyols with 2 to 6, preferably 2 to 3, and particularly 2 hydroxyl groups and a carboxylic anhydride or mixtures of anhydrides at temperatures from 50° to 150° C., preferably from 90° C. to 130° C. with reaction times of 2 to 10 hours, preferably 3 to 5 hours. For this purpose, the components are reacted in such amounts that 1 to 3 moles, preferably 1 mole, of carboxylic anhydride are present per mole of polyol and that 2 to 6, preferably 2 hydroxyl groups are present in the reaction mixture per anhydride group.

The resultant carboxylic acid half esters are subsequently oxyalkylated in the presence of a catalytic amount of a thiodialkylene glycol ranging from 0.001 to 0.1 mole, preferably 0.002 to 0.05 mole, of thiodialkylene glycol per carboxyl group as catalyst and 1 mole of alkylene oxide per carboxyl group at temperatures of 80° C. to 160° C., preferably of 90° C. to 130°, under normal pressure, or preferably under increased pressure, of 0.5 to 10 bars, preferably in the presence of gases which are inert under the reaction conditions such as nitrogen, helium and others or mixtures of these gases.

After reaching an acid number of less than 1, the oxyalkylation is terminated. If the reaction mixture still contains free monomeric alkylene oxide, it is removed by stripping under reduced pressure.

The following should be stated concerning the starting components to be used for the preparation of the polyester polyols and/or polyester-polyether polyols:

The following polyols have proven to work well for the preparation of carboxylic acid half esters: di- to hexafunctional, preferably di- to trifunctional, polyhydric alcohols with molecular weights of 62 to 350, preferably 62 to 140, such as ethylene glycol, trimethylene glycol, 1,2-propylene glycol, 1,4-butanediol, diethylene glycol, dipropylene glycol, 1,3-pentanediol, 1,5-pentanediol, 1,6-hexanediol, 1,7-heptanediol, glycerine, 1,1,1-trimethylolpropane, 1,1,1-trimethylolethane, 1,2,6-hexane triol, α-methylglucoside, pentaerythritol and sorbitol. Preferably used, however, are the di- to hexafunctional and particularly di- and/or trifunctional polyether polyols having hydroxyl numbers of 30 to 200 and preferably 50 to 110. The polyether polyols in turn may be prepared by poly addition of alkylene oxide such as 1,2- or 2,3-butylene oxide, 1,3-propylene oxide or preferably ethylene oxide and/or 1,2-propylene oxide to commonly used initiator molecules such as the above-mentioned polyhydric alcohols in the presence of acid or preferably basic catalysts or by polymerization of tetrahydrofuran with known catalysts such as boron trifluoride etherate, antimony pentachloride or fuller's earth. The polyols may be used individually or in the form of mixtures. Preferably used are polypropylene ether glycols with molecular weights of 500 to 3000.

Suitable as carboxylic anhydrides are the substituted aromatic mono- or dianhydrides and preferably halogen substituted aliphatic anhydrides. Examples of these include: aromatic carboxylic anhydrides such as phthalic anhydride, tetrachlorophthalic anhydride, tetrabromophthalic anhydride, trimellitic anhydride, and pyromellitic dianhydride, and aliphatic carboxylic anhydrides such as maleic anhydride, dichloromaleic anhydride, succinic anhydride and preferably glutaric anhydride.

In accordance with this invention, thiodialkylene glycols are used as catalysts for the oxyalkylation of the carboxyl groups of the carboxylic acid half esters. Thiodialkylene glycols with 2 to 6, preferably 2 to 3, carbon atoms in the alkylene radical, for example, have proven to work well. Examples include thiodihexylene glycol, thiodibutylene glycol, and preferably thiodipropylene glycol and/or thiodiethylene glycol.

For the oxyalkylation of the carboxyl groups, 1,2-propylene oxide and preferably ethylene oxide are used.

The polyester polyols or polyester-polyether polyols produced in accordance with this invention have an acid number less than 1 and a content of monomeric alkylene oxides of less that 1 percent by weight.

The polyester polyols and polyester-polyether polyols are valuable auxiliaries and intermediates.

Polyester-polyether polyols produced by esterification of carboxylic acid half esters based on polypropylene glycol and preferably glutaric anhydride with 1 mole of ethylene oxide per carboxyl group are used particularly in the production of polyurethane.

The parts referred to in the examples are parts by weight.

EXAMPLE 1

A. Preparation of a polypropylene ether-glycolglutaric acid half ester

In a reactor suited for oxyalkylations a polypropylene ether glycol having a hydroxyl number of 112 was prepared by reacting under a nitrogen pad 402.5 parts of dipropylene glycol and 2597 parts of propylene oxide with 6 parts of potassium hydroxide as the catalyst.

The crude polypropylene ether glycol was mixed with 684 parts glutaric anhydride and the carboxylic acid half ester was formed while being stirred at 100° C. for four hours.

B. The resultant polypropylene ether-glycolglutaric acid half ester was mixed with 6 parts of thiodiethylene glycol. The nitrogen pressure was adjusted to 2 bars and 290 parts of ethylene oxide was added at 105° C. over a period of 2 hours. The ethylene oxide was subsequently allowed to completely react until the pressure had reached a constant value of 2.5 bar. The reaction mixture was cooled, depressurized, 60 parts of an aluminum magnesium silicate Ambosol ® were added, and the mixture was filtered.

The yield of the hydroxy-polypropylene ether-2-hydroxyethyl-glutarate was 3900 parts with a hydroxyl number of 82 and an acid number of 0.1.

COMPARISON EXAMPLE A

Employing the procedure of Example 1 in the absence of the thiodiethylene glycol catalyst, a product of hydroxy polypropylene ether-2-hydroxyethyl-glutarate was obtained which had a hydroxyl number of 90 and an acid number of 34.

COMPARISON EXAMPLE B

Employing the procedure of Example 1 except that 474 parts of ethylene oxide were used instead of 290 parts, a product of hydroxy-polypropylene ether-2-hydroxyethylglutarate was obtained with a hydroxyl number of 93 and an acid number of 0.3.

Example 1 and Comparison Example A and B show that a considerably higher ethylene oxide amount must be used for the catalyst-free ethoxylation in order to achieve the same acid number.

EXAMPLE 2

In a reactor suited for oxyalkylation, 600 parts of a polypropylene ether triol having a hydroxyl number of 560 and produced from glycerin and propylene oxide was mixed with 188.7 parts of glycerin under a nitrogen pad. An amount of 1896.7 parts of tetrabromophthalic anhydride was added to the mixture and the addition reaction was completed while being stirred at 100° C. for a period of 5 hours.

The resultant polypropylene ether triol-tetrabromophthalic acid half ester was mixed with 3 parts of thiodiethylene glycol. The nitrogen pressure was adjusted to 2 bar, and 590 parts of propylene oxide were added at 105° C. over a period of 4 hours. The propylene oxide was then allowed to completely react until the pressure had reached a constant value of 2.5 bars, the reaction mixture was cooled, the reaction vessel was depressurized, 40 parts of an aluminum magnesium silicate were added for neutralizing purposes and the end product was filtered.

An amount of 3200 parts of a hydroxy polypropylene ether triol-2-hydroxy propyl phthalate was obtained with a hydroxyl number of 200 and an acid number of 0.5.

COMPARISON EXAMPLE C

Employing the process of Example 2 except that 3 parts of boron trifluoride diethyletherate was used as the oxypropylation catalyst instead of thiodiethylene glycol, a hydroxy-polypropylene ether-triol-2-hydroxy propyl-phthalate was obtained which had a hydroxyl number of 210 and an acid number of 30.

The embodiments of the invention in which an exclusive privilege or property is claimed are defined as follows:

1. A process for the preparation of polyester-and/or polyester-polyether polyols by reaction of a polyol with a carboxylic acid anhydride forming carboxylic acid half esters and subsequently oxyalkylating the carboxylic half esters with alkylene oxides in the presence of a catalytic amount of at least one thiodialkylene glycol.

2. The process of claim 1 wherein thiodiethylene glycol and/or thiodipropylene glycol are used as the thiodialkylene glycols.

3. The process of claim 1 wherein 0.002 to 0.05 mole of thiodialkylene glycol is used per carboxyl group of the carboxylic acid half ester.

4. The process of claim 1 wherein di- to hexafunctional polyether polyols with hydroxyl numbers of 30 to 200 are used as the polyols.

5. The process of claim 1 wherein glutaric anhydride is used as the carboxylic acid anhydride.

6. The process of claim 1 wherein ethylene oxide is used as the alkylene oxide.

7. The process of claim 1 wherein one mole of alkylene oxide is used per carboxyl group of the carboxylic acid half ester.

* * * * *